UNITED STATES PATENT OFFICE.

AARON J. SHRIVER, OF BALTIMORE, MARYLAND, ASSIGNOR TO SARAH M. SHRIVER, OF SAME PLACE.

IMPROVEMENT IN PROCESSES OF RESTORING CRAPE, LACES, &c.

Specification forming part of Letters Patent No. 179,361, dated June 27, 1876; reissue No. 7,765, dated June 26, 1877; application filed May 12, 1877.

*To all whom it may concern:*

Be it known that I, AARON JOSEPH SHRIVER, of Baltimore city and State of Maryland, have invented and applied a new Process in the Manufacture and Finishing of Crapes, Lace, Barege, Grenadine, and other similar light and thin fabrics, and in refinishing the same, for the purpose of preserving the same and rendering them impervious to moisture to this extent—that is to say, not subject to discoloration or damage by the action of air or water, or by exposure to the weather; and for strengthening and making more firm and durable all such fabrics and giving them a silk-like appearance; also, for renovating and restoring all the aforesaid fabrics when the same have become discolored or damaged by use, exposure, or otherwise, and rendering the same not subject to discoloration or damage by the action of air or water or exposure to the elements; and I do hereby declare the following to be substantially a clear and true description of the same.

When a dye is used, after selecting and preparing the required coloring matter, to it is added a solution of gum-shellac in alcohol, in proportion and quantity required for the material to be treated. The fabric to be treated is then immersed for a few minutes in the composition until it is thoroughly saturated with the same, and then exposed to a jet of steam, the material being passed through the steam until every portion of the fabric has been thoroughly subjected to the action of the same. The action of the steam is designed to bring out freshly and clearly the color of the dye, to expel the alcohol, and, in crape, to set the crimp and to impart to all fabrics a beautiful and silk-like appearance.

The shellac, being insoluble in water, by the action of the steam is left in a dried condition upon the fabric, and serves to protect the same from the action of water or the weather, and preserve the freshness of its color and texture.

When the fabric does not require dyeing the solution of shellac alone is used, being treated with steam, the same as when dye is used.

In the application and use of my process I do not confine myself to the use of gum-shellac alone, though most generally used, but as conditions may require, use gum-sandarac, gum-mastic, or any other gum, soluble in alcohol and not soluble in water, to impart the requisite protection, body, and stiffness.

My process and solution, as thus described, completely fixes the color, preserves its beauty, and protects the same and the fabric from injury by water or the weather at small cost.

What I claim is—

That by the hereinbefore described process and solution fixing and preserving the color and texture of all fabrics hereinbefore described, and renovating and restoring the same when defaced or damaged from any cause by first immersing the fabric in a solution consisting of a dye-stuff, alcohol, and a gum soluble in alcohol and insoluble in water, and then subjecting the same to the action of steam, substantially as and for the purposes described.

A. J. SHRIVER.

Witnesses:
FRED. T. BAKER,
HENRY A. LUCY.